United States Patent
Zhu et al.

(10) Patent No.: US 6,301,386 B1
(45) Date of Patent: Oct. 9, 2001

(54) METHODS AND APPARATUS FOR GRAY IMAGE BASED TEXT IDENTIFICATION

(75) Inventors: Jie Zhu, Duluth; Michael C. Moed, Roswell, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/207,974

(22) Filed: Dec. 9, 1998

(51) Int. Cl.⁷ ............................................. G06K 9/34
(52) U.S. Cl. .................. 382/176; 382/176; 382/173
(58) Field of Search ................. 382/173, 176, 382/308, 257, 205, 171–172, 137, 187, 194, 202, 203

(56) References Cited

U.S. PATENT DOCUMENTS

| | | | |
|---|---|---|---|
| 4,910,787 | * 3/1990 | Umeda et al. | 382/194 |
| 5,181,255 | * 1/1993 | Bloomberg | 382/176 |
| 5,778,092 | * 7/1998 | Macleod et al. | 382/176 |
| 5,937,084 | * 8/1999 | Crabtree et al. | 382/137 |
| 5,963,662 | * 10/1999 | Vachtsevanos et al. | 382/150 |
| 5,999,664 | * 12/1999 | Mahoney et al. | 382/305 |
| 6,026,183 | * 2/2000 | Talluri et al. | 382/194 |
| 6,055,327 | * 4/2000 | Aragon | 382/138 |

* cited by examiner

Primary Examiner—Joseph Mancuso
Assistant Examiner—Ali Bayat
(74) Attorney, Agent, or Firm—Priest & Goldstein, PLLC (57) ABSTRACT

Methods and apparatus for gray image based text identification. A gray image of a document is preferably subsampled to reduce the amount of information to be processed, while retaining sufficient information for successful processing. The subsampled image is subjected to preprocessing to remove horizontal and vertical lines. The image is then subjected to a morphological open operation. The image is then segmented to separate foreground and background information to produce a foreground image. Region filtering and merging are performed on the foreground image. Region features are then extracted and region identification performed. Homogenous regions are grouped and noise elimination performed, resulting in a number of small regions of known types. Optical character recognition can then be performed on each of the regions. The use of the information provided by variations in pixel lightness and darkness enables text identification to proceed quickly and efficiently.

22 Claims, 10 Drawing Sheets

METHODS AND APPARATUS FOR GRAY IMAGE BASED TEXT IDENTIFICATION

FIELD OF THE INVENTION

The present invention relates generally to text identification. More particularly, the invention relates to advantageous aspects of methods and apparatus for gray image based text identification.

BACKGROUND OF THE INVENTION

The ability to locate and read the relevant information from a financial item is a valuable feature of information processing, and is especially useful in the processing of financial documents. Many financial documents, such as checks, contain entries made in a human-readable format such as printing or handwriting. Many of these entries are not made in a standard machine-readable format such as printing with magnetic ink according to a known standard such as E13B or the like. At least some of the non-standardized information appearing on a check must be translated to machine-readable format, or hand entered directly into a machine processing the check. For example, the amount of a check is typically not entered onto the check in machinereadable format at the time the check is written. The amount of the check, however, is critical to processing of the check, and must be communicated to the check-processing equipment. This has traditionally been done by human operators who read the amount written on the check and enter this amount into a machine which then prints the amount onto the check in magnetic ink.

More recently, however, it has become possible to devise techniques for machine-reading of the non-standardized information, in order to increase processing speed and reduce costs. This machine-reading is typically done by capturing and interpreting an image of the item in order to extract text fields. The captured image is typically a gray image, having areas of varying lightness and darkness; or in other words, pixels of differing gray scale.

Prior art methods typically begin by applying a binarization algorithm to the captured gray image of a document. This results in a binary image, where foreground pixels are black, and background pixels are white. Connected component analysis is performed on the binary image to assemble groups of touching black pixels. Connected components are then grouped into tokens, which are classified into horizontal lines, vertical lines, machine-printed text, and hand-printed text. Statistical features are extracted for each token. The document is classified based on the extracted tokens, where possible classifications include a business check, personal check, deposit slip, giro, or currency. Each area of machine-printed text and hand-printed text is grouped into a zone. Finally, optical character recognition is performed on the zones of interest.

However, it has become increasingly difficult to obtain a good quality binary image as financial institutions are using documents with more and more complex graphical and/or textured backgrounds embedded to prevent fraud. These backgrounds appear lighter on the documents than does the foreground information, but the binarization processes of the prior art remove the information contributed by the lightness of the background. When binarization is completed, the background material appears as dark as does the foreground material, making it difficult to extract the foreground material from the background material. Text recognition becomes more difficult and errors in extracting text from the binary image are more likely to occur.

There exists, therefore, a need in the art for a means for automatic extraction of information from a document which is less susceptible to interference by the presence of background material.

SUMMARY OF THE INVENTION

In accordance with one aspect of the present invention, a method of text identification operates on a gray image as described below. The gray image is preferably subsampled to reduce data to be processed and preprocessed to remove horizontal and vertical lines in the image. The image is subjected to a morphological open, followed by foreground/background segmentation to produce a foreground image. The foreground image is subjected to region filtering, region merging, and region feature extraction and identification. Homogeneous regions are grouped, and noise elimination is performed, leaving a number of small, identified regions. Optical character recognition may then conveniently be performed on the identified regions. With the information provided by the different degrees of lightness and darkness of different portions of the document, background or other extraneous information is able to be identified and removed, and text identification can then proceed on smaller areas of specific interest, at greatly increased speed and efficiency compared to typical binarization-based text identification of the prior art.

A more complete understanding of the present invention, as well as further features and advantages of the invention, will be apparent from the following Detailed Description and the accompanying drawings.

DETAILED DESCRIPTION

Figure 1:
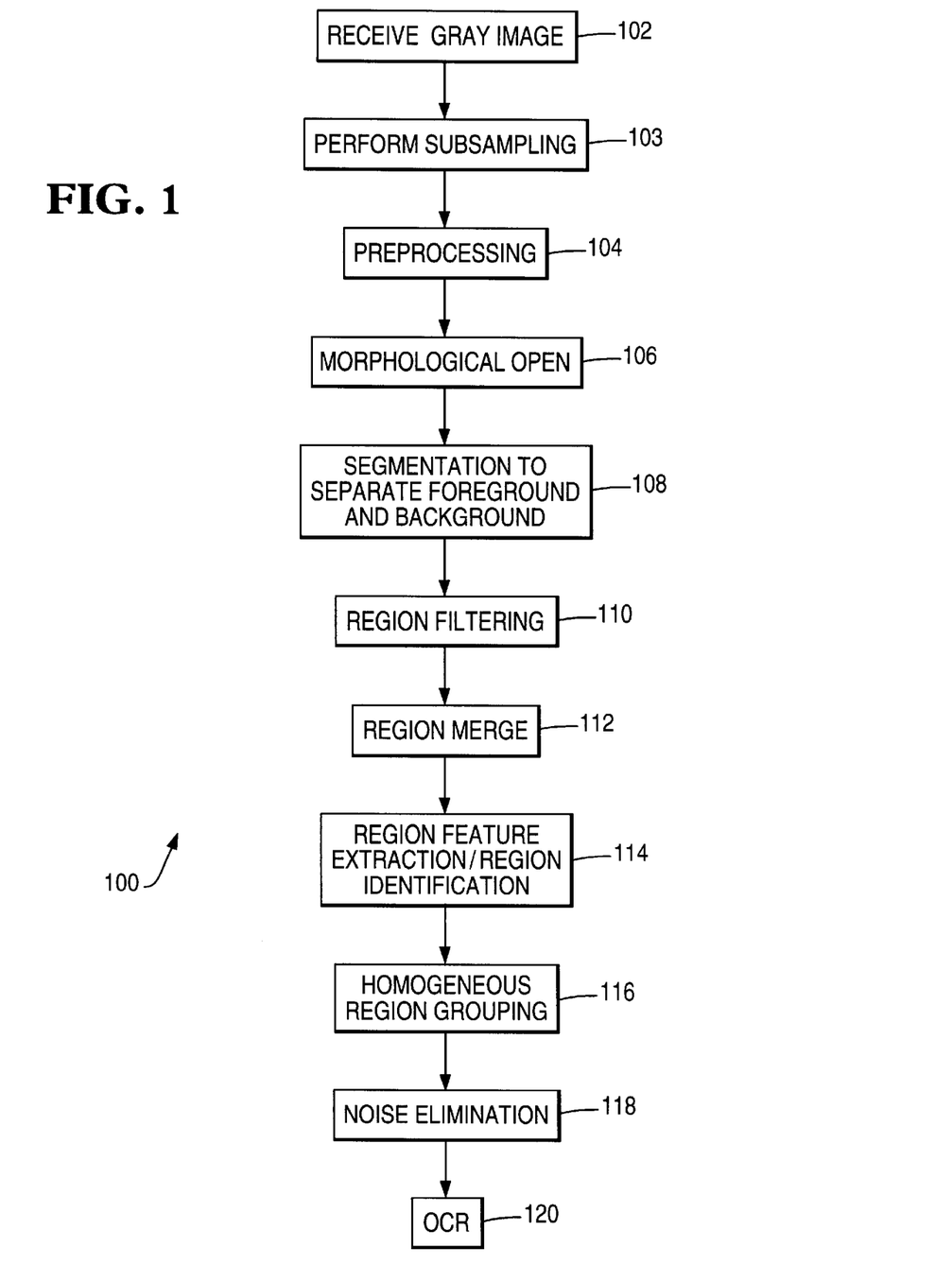
FIG. 1 is a flowchart illustrating a method of gray-image text recognition according to the present invention.

FIG. 1 illustrates the steps of a method 100 of gray image text recognition according to the present invention. At step 102, a gray image is received. The gray image is preferably a low-resolution image. At step 103, the image is subsampled to reduce the amount of data required to be processed. Typically a sampled image contains 200 pixels per inch. It has been found that a resolution of 50 pixels per inch provides sufficient detail for processing. Therefore a 4-to-1 subsampling is performed at step 103 in order to reduce processing demands. At step 104, the gray image is subjected to preprocessing to identify and remove horizontal and vertical lines, to produce a preprocessed image.

At step 106, a morphological open operation is applied to the preprocessed image to produce a morphologically processed image. This operator consists of morphological erosion (Min) followed by a morphological dilation (Max). Both are performed on the same window size (nominally 5 by 1). The open operation is only applied horizontally, because the text zones of interest are oriented horizontally and it is not desirable to merge text lines of different zones.

Following a morphological open operation, text regions stand out clearly as dark blobs and characters in the same words (or sometimes in the same field) are connected. For hand-printed text, the originally disconnected strokes are now in the same blob. However, random noise scattered in the document image is still isolated. Furthermore, the texture pattern in the background is blurred, and in some cases becomes quite uniform. As a result, the opened image makes it easier to separate text from the background and noise.

At step 108, segmentation is performed to separate foreground information from background information, producing a foreground image. Segmentation is based on the assumption that financial items contain background pixels that are predominantly lighter than the foreground text.

At step 110, region filtering is applied to remove connected regions, also called blobs, which are unlikely to be text areas, to produce a region-filtered image. Three different filters are then preferably applied. The first filter removes extremely large blobs that are not likely to be text. The second filter removes those regions that are not likely to be text because their aspect ratio (ratio of region height to region width) is either too small or too large. The third filter removes the blobs that are two small and too far away from other blobs to be a text segment. These small blobs could result from noise, or dark segments of a textured background.

At step 112, the region-filtered image is subjected to a region merge to produce a region-merged image. The region merge step reconstructs the fragmented text that is due to poor handwriting, imaging, or thresholding. The small blobs and their neighbors are examined. If a blob is close enough to its neighbor based on their sizes, it is merged with its neighbor. This operation is performed recursively until all small blobs are tested and no more meet the requirement for merging. After this stage, each region typically represents a single word or multiple adjacent words in the same line. However, it is also possible for a foreground region to be another type of foreground area, such as a logo or drawing, having a size and dimension similar to that of text.

The steps of region identification, filtering and merging include identification of a number of additional features associated with each region. Identified features may include, for example, region width, height, aspect ratio, area, centroid, and foreground pixel count. These features can be used to distinguish regions from one another. For example, text regions can be distinguished from other regions, and machine print and hand print regions can be identified.

At step 114, therefore, region feature extraction and region identification are performed on each region based on the image produced by the morphological operation. Features may include rectangular fill, which represents the percentage of pixels in the bounding rectangle of the region that are foreground pixels. Machine print regions should have substantially higher rectangle fill than hand print regions. Features may also include edge fill, which describes the percentage of pixels that are near the edges of the bounding rectangle. Machine print regions typically have higher edge fill. Assessing both rectangular fill and edge fill together with the height and aspect ratio of a region, each region can be classified into one of three categories: Machine print, Hand print and Other.

At step 116, homogeneous region grouping is performed. Neighboring regions of the same type are grouped horizontally, if the spacing between them meets certain requirements. The presently preferred rules for grouping are that the distance between regions in a group must not exceed the length of either region and the spaces between three or more regions must be approximately equal.

At step 118, noise elimination is performed. Size filtering is performed to filter out regions too large to be text. Step 118 is required because the previous steps of regions merge 114 and region grouping 116 may create large regions.

At step 120, optical character recognition is performed on each region. As a result of the region identification performed in steps 102–120, optical character recognition is performed on a number of small fields. These fields contain less extraneous background detail than similar fields produced by the prior art binarization method. This approach greatly increases the efficiency and accuracy of the optical character recognition step.

FIGS. 2–5 illustrate in greater detail the step of preprocessing 104 shown in FIG. 1. In most financial items, there are pre-printed horizontal and vertical lines surrounding various text zones, such as the box around the courtesy amount zone, and lines under the legal amount zone, signature zone, etc. These lines cause interference for the text detection process. However, the relative positions between some of these lines and the text zones they surround can provide valuable information regarding the identity of these zones as well as the type of document being examined. Therefore, finding and removing the lines is an important task. As a byproduct, the preprocessing step also finds the location of the item in the image and discards the pixels beyond the boundary, reducing the amount of data that needs to be processed later on.

Figure 2:
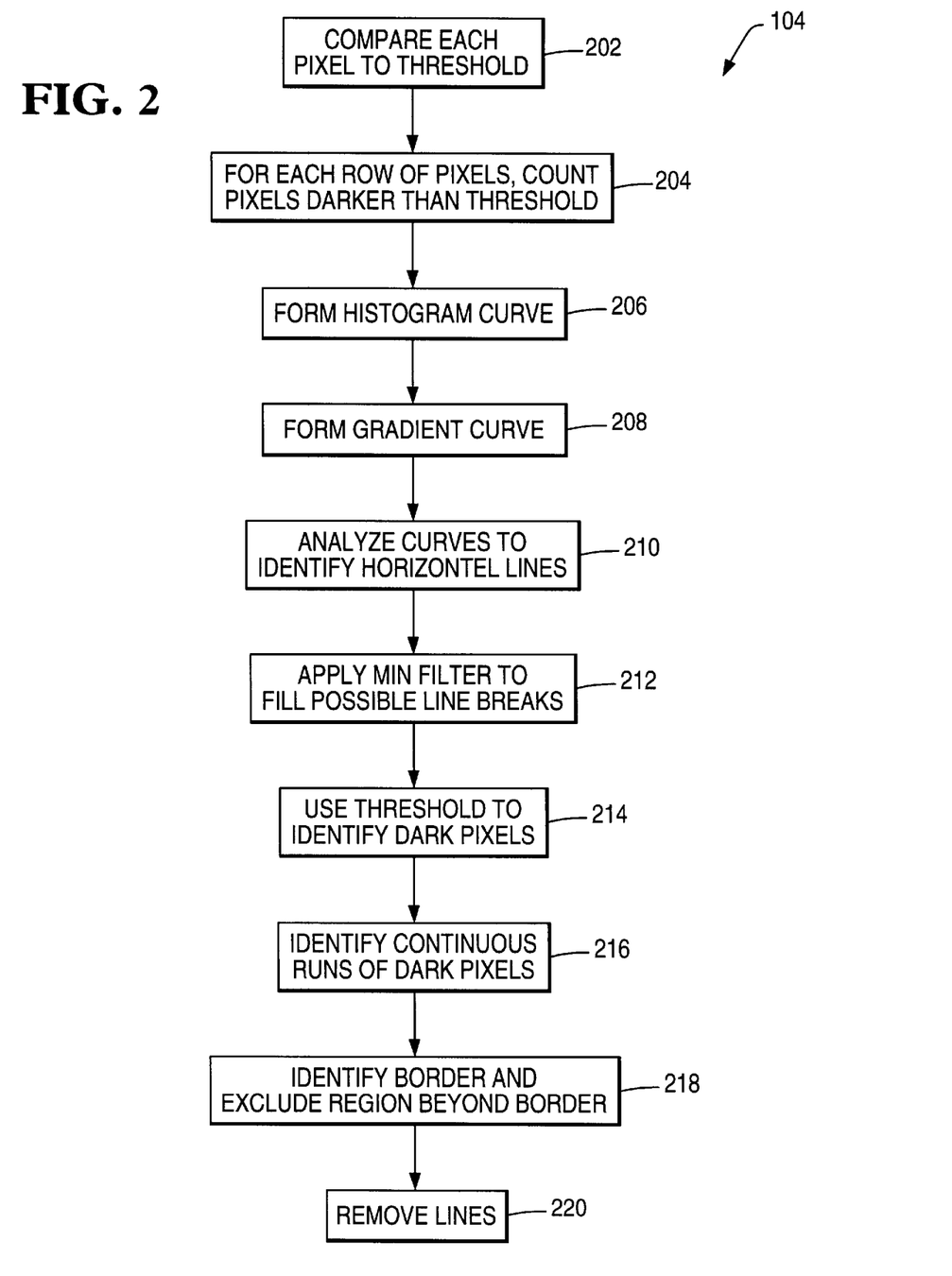
FIG. 2 illustrates additional details of a preprocessing step according to the present invention.

FIG. 2 illustrates additional details of the preprocessing step 104 of FIG. 1.

At step 202, each pixel in the image is compared to a predetermined, tunable threshold value. The value 110 may preferably be used as a default threshold, based on the observation that the intensity level of lines of interest is lower than 110.

At step 204, for each row of pixels, the number of dark pixels, that is, pixels darker than the threshold, is counted.

Figure 4:
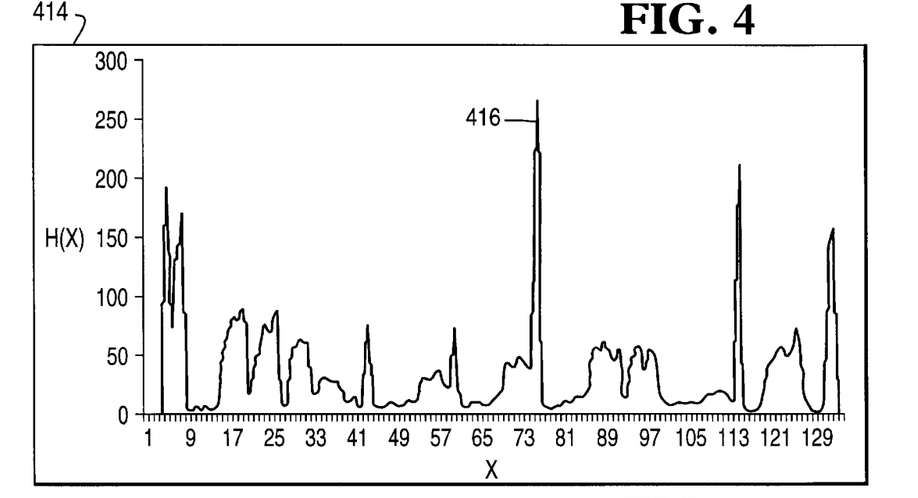
FIG. 4 illustrates a histogram produced in preprocessing the image.

At step 206, the number of dark pixels for each row is used to form a histogram, which may be expressed in a histogram curve H(x) (FIG. 4).

Figure 5:
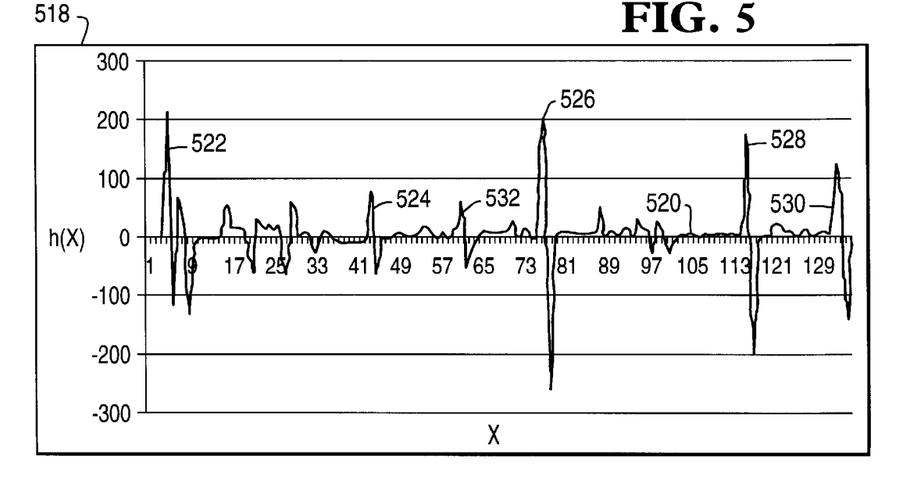
FIG. 5 illustrates a gradient curve produced from the histogram of FIG. 4.

At step 208, the gradient or difference of adjacent values of the H(x) curve is computed, to form a gradient curve h(x) (FIG. 5).

At step 210, analysis of histogram curve such as histogram curve 416 and a gradient curve such as gradient curve 420 is executed to identify horizontal and vertical lines. After horizontal and vertical lines are identified, a search algorithm must be executed to identify the exact location of the lines. Control is passed to step 212 and a MIN filter is applied to each row containing a line to fill up possible line breaks. In other words, gaps or breaks between two line segments less than some predetermined minimum threshold or MIN are identified and filled in. This is necessary because a long line is often broken into several segments through the process of imaging and subsampling. Next, at step 214, a threshold is used to identify the dark pixels. This is usually the same threshold as the one used previously for computing the histogram. Next, at step 216, continuous runs of dark pixels are identified. If the length exceeds a threshold, a line is found. This threshold is important so that a long horizontal stroke of machine printed text will not be removed. Next, at step 218, long lines close enough to the boundary of the image, are considered to be borders. The image size is further reduced to exclude the region beyond the border. Finally, at step 220, the lines are removed by replacing the intensity of the pixels with that of the neighboring pixels in the previous row, if they are lighter.

It is a feature of the present invention that that any text which overlapped the lines is not affected by removal of the horizontal lines or clipping of the borders as a result of execution of the preprocessing step 104. For example, a script letter "y" which extends across a horizontal line would not be cut in half by removal of the horizontal line.

Figure 3:
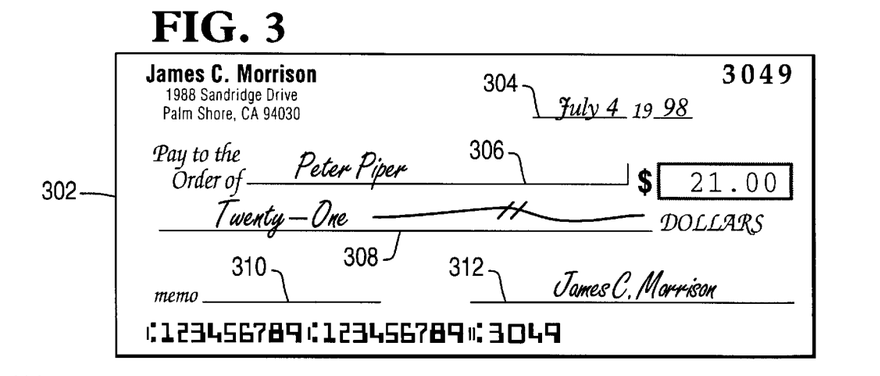
FIG. 3 illustrates an image which contains lines to be removed in the preprocessing step.

FIG. 3 illustrates a check image 302 before execution of the preprocessing step 104, without background material for clarity. The check image 302 includes first through fifth horizontal lines 304–312

FIG. 4 illustrates a histogram graph 414 including a histogram curve 416 resulting from analysis of the check image 302.

FIG. 5 illustrates a gradient graph 518 including a gradient curve 520.

Boundaries of the horizontal lines 304–312 are represented by pairs of coupled peaks 522–530, respectively. The coupled peak pairs 522–530 represent the boundaries of lines 304–312. The pairs are coupled as each of the pairs 522–530 includes a negative peak followed by a positive peak, Not every pair of peaks is considered to represent a line. Also visible on gradient curve 520 is pair 532, which does not represent a line. In order to distinguish pairs which represent lines from pairs which do not represent lines, thresholding is employed. Suitable thresholds are expressed in terms of the magnitude of the peaks (minimum length of a segment to be considered as a line), the distance between the two peaks Ln the pair (maximum thickness of the Line), and difference in magnitude between the two peaks.

Figure 6:
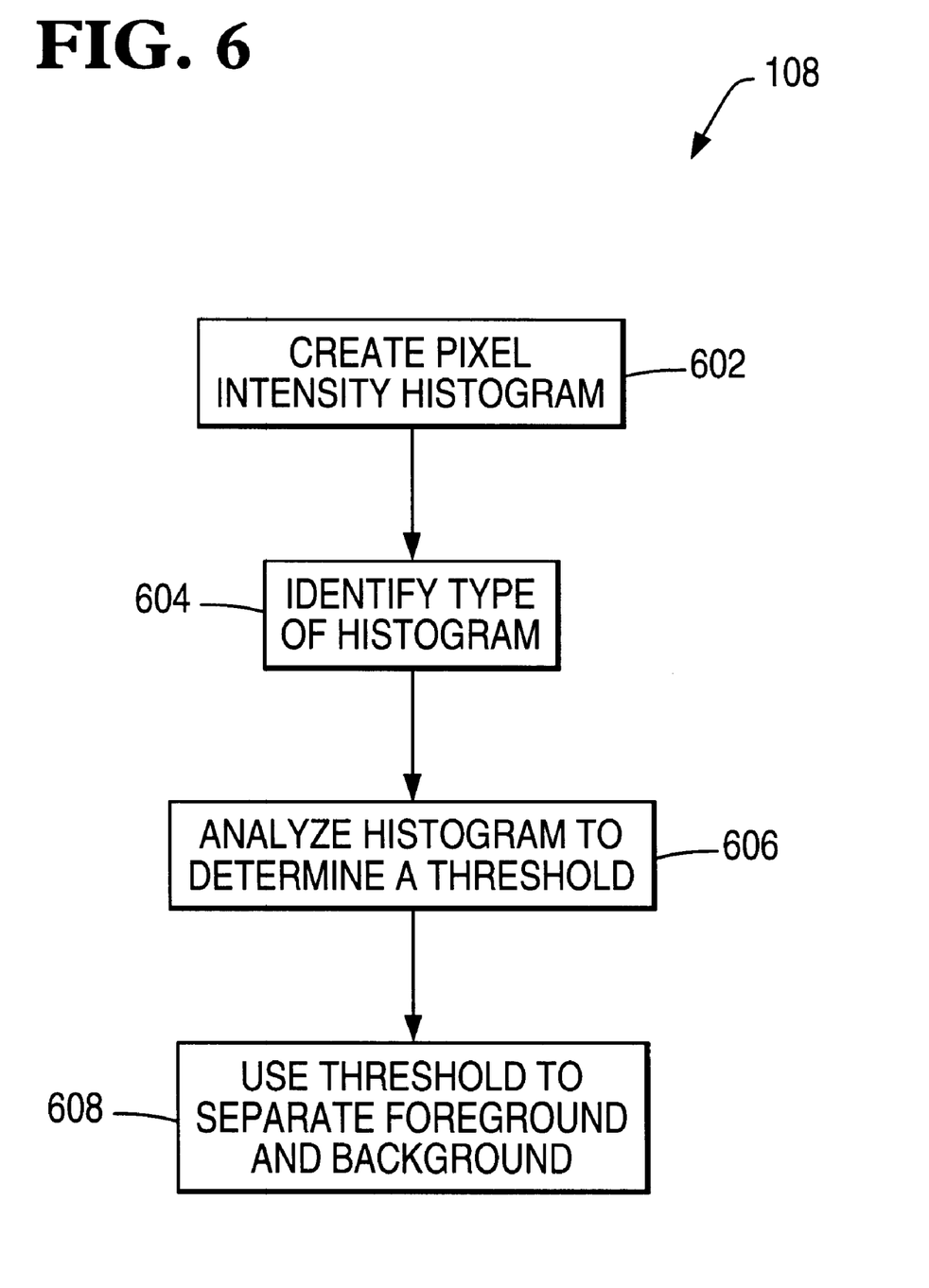
FIG. 6 is a flowchart illustrating additional details of a foreground/background segmentation step according to the present invention.

FIG. 6 is a flowchart illustrating in greater detail the foreground/background segmentation step 108 illustrated in FIG. 1. At step 602, a pixel intensity histogram is created. At step 604, the type of histogram is identified. At step 606, the histogram is analyzed to determine a threshold. The rules for analyzing the histogram and determining the threshold are developed below in connection with the discussion of FIGS. 7–11. At step 608, the foreground and background are separated, with pixels with an intensity below the threshold being identified as foreground pixels and pixels with an intensity above the threshold being identified as background pixels.

Figure 7:
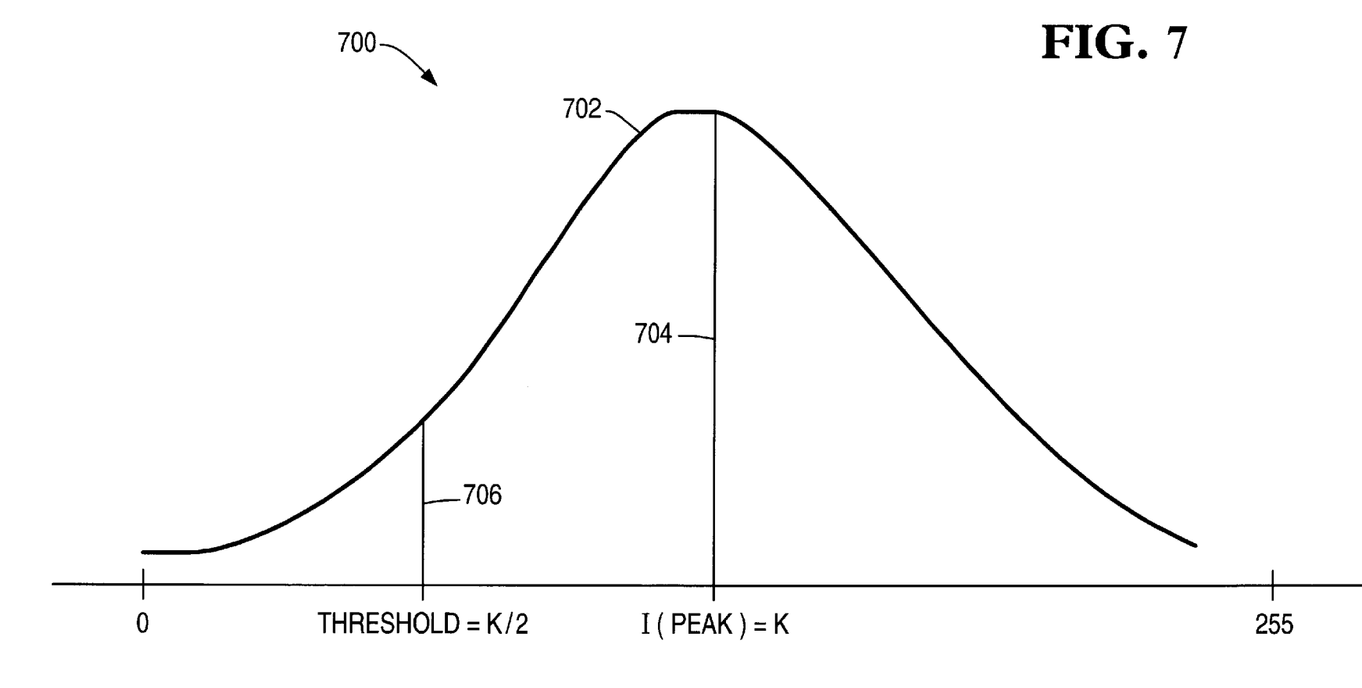
FIG. 7 is a unimodal histogram used in foreground/background segmentation of a unimodal case according to the present invention.

FIG. 7 is a graph 700 illustrating a unimodal histogram curve 702 of a unimodal case. The unimodal histogram curve 402 includes a single peak 404. The threshold level 406 is set at half the level of the peak 404.

Figure 8:
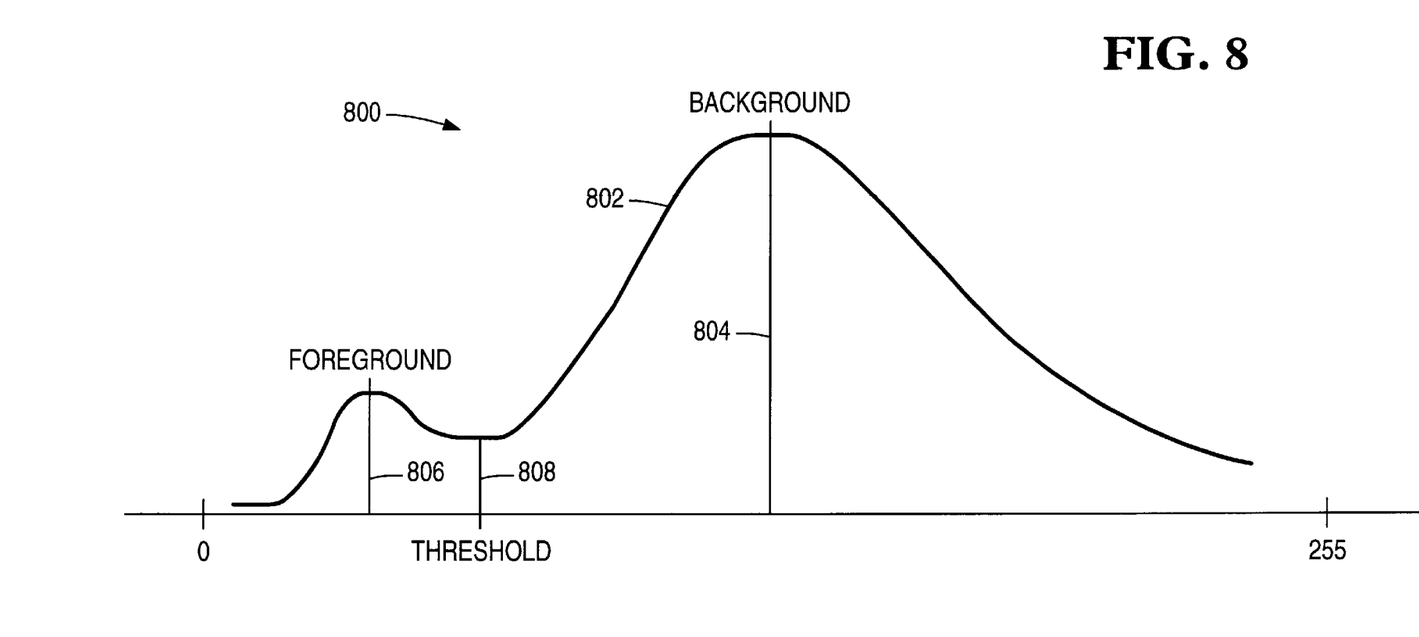
FIG. 8 is a bimodal histogram used in foreground/background segmentation of a bimodal case according to the present invention.

FIG. 8 is a graph 800 illustrating a bimodal histogram curve 802 of a bimodal case. The bimodal histogram curve 802 includes a first peak 804 and a second peak 806, with a valley 808 between the first peak 804 and the second peak 806. The threshold between foreground and background is represented by the valley 808.

Figure 9:
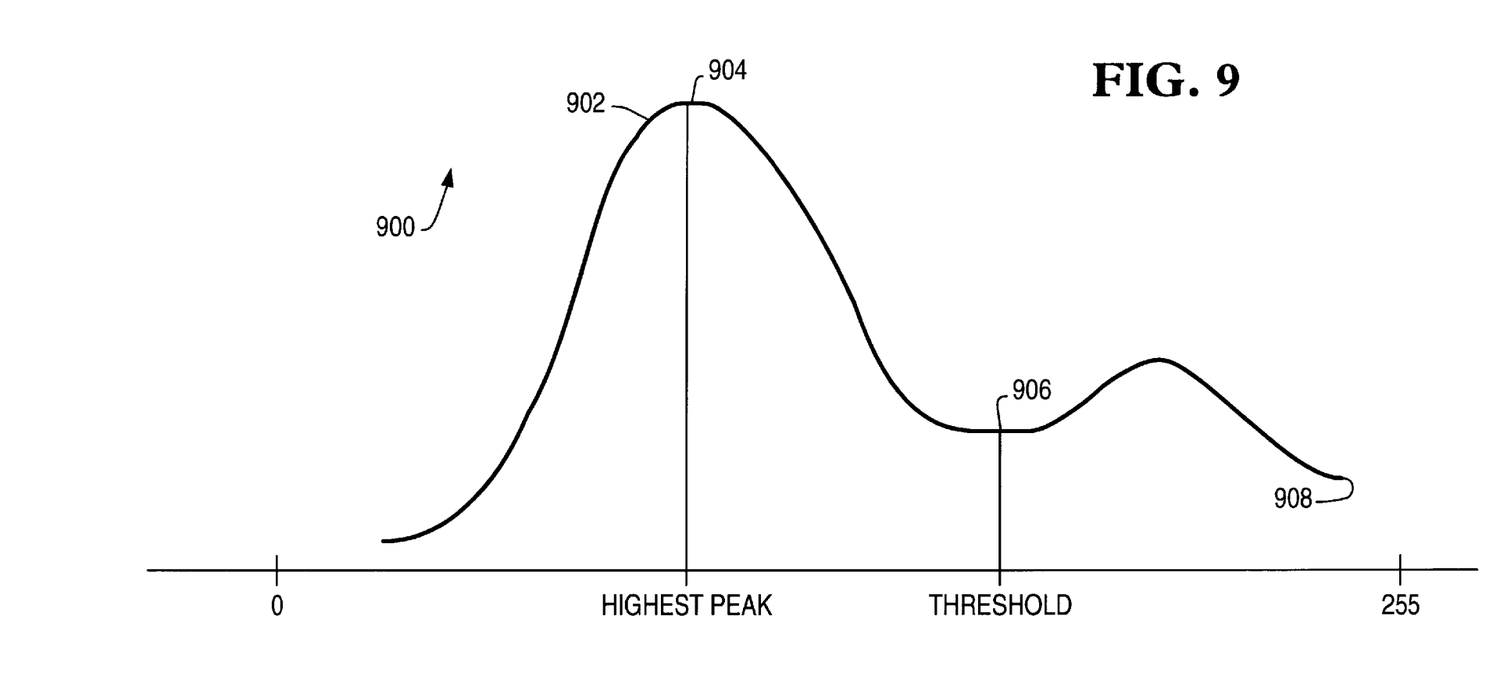
FIG. 9 is a high-valley bimodal histogram used in foreground/background segmentation of a high-valley bimodal case according to the present invention.

FIG. 9 is a graph 900 illustrating a high-valley bimodal histogram curve 902 of an abnormal bimodal case. The high-valley bimodal curve 902 includes a peak 904 and multiple valleys, which are first valley 906 and second valley 908. In the case of the high-valley bimodal histogram curve, all valleys are of a higher intensity level than the highest peak 904. This indicates that the foreground pixels are more dominant than the background pixels. In this case, the first valley 906 is used as the threshold.

Figure 10:
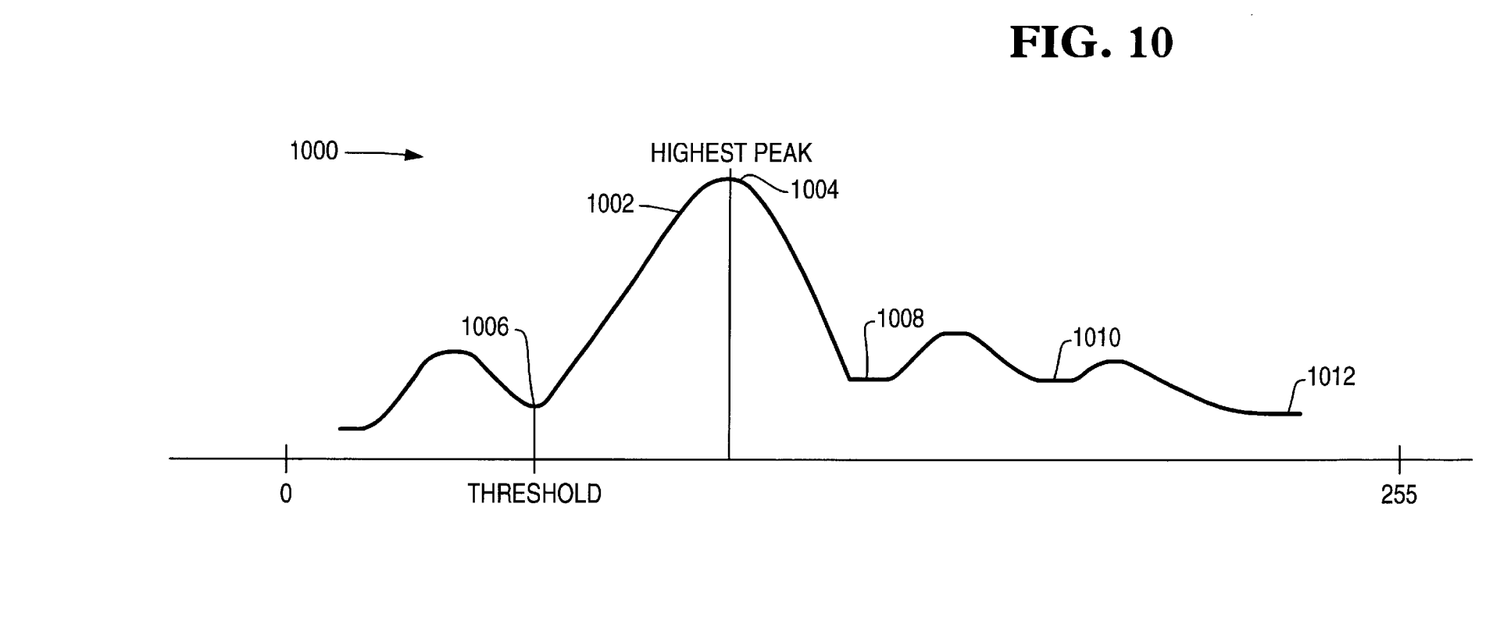
FIG. 10 is a multiple-valley histogram used in foreground/background segmentation of a multiple-valley case according to the present invention.

FIG. 10 is a graph 1000 illustrating a multiple-valley histogram curve 1002 of a simple multiple-valley case. The multiple-valley curve 1002 includes a peak 1004, a first valley 1006, which is below the peak 1004, and second, third and fourth valleys 1008, 1010 and 1012. Only the first valley 1006 is below the peak 1004. In this case, the threshold is the level at the first valley 1006.

Figure 11:
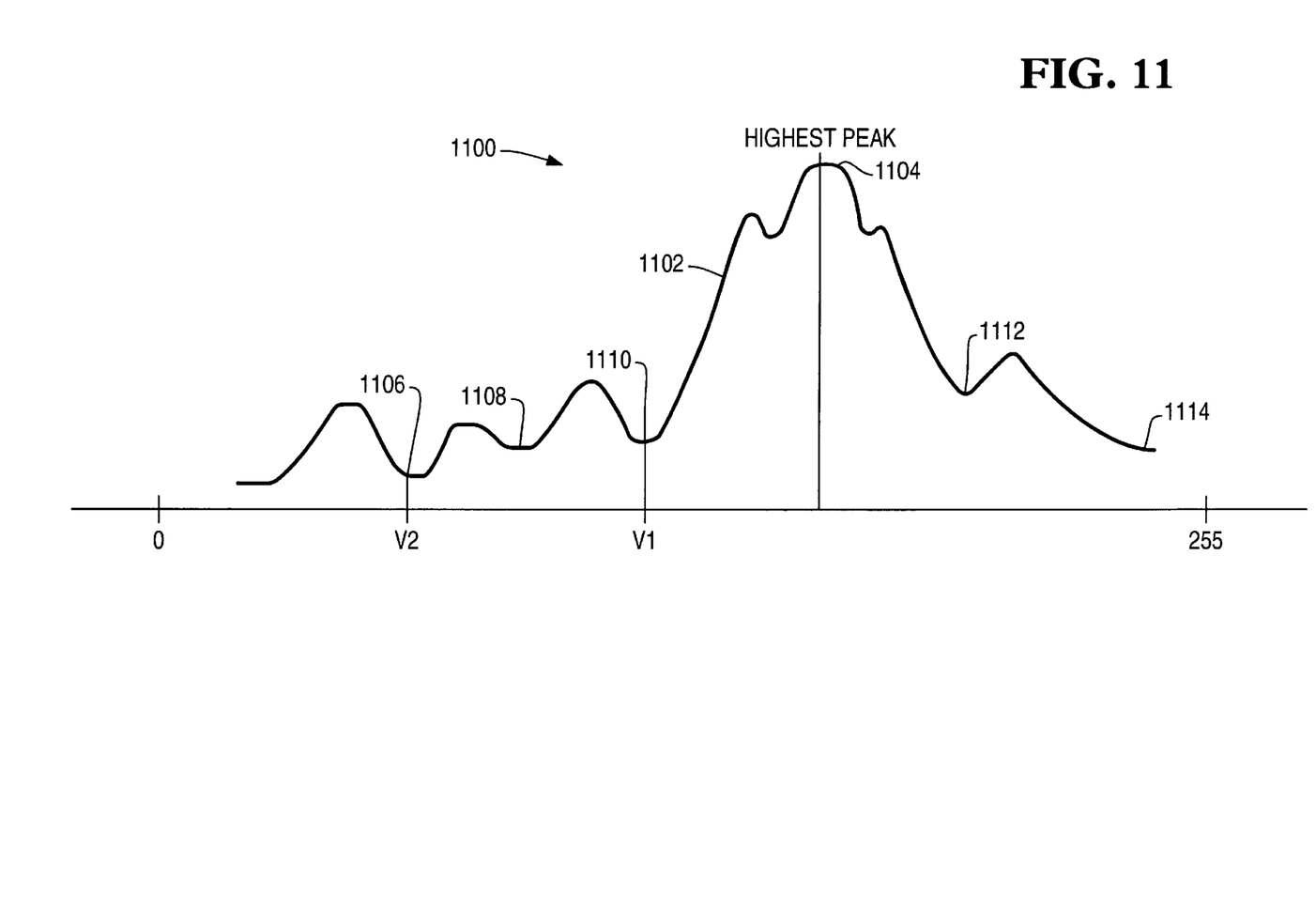
FIG. 11 is a complex multiple-valley histogram used in foreground/background segmentation of a complex multiple-valley case according to the present invention.

FIG. 11 is a graph 1100 illustrating a complex multiple valley histogram curve 1102 of a complex multiple-valley case. The complex multiple-valley curve 1102 includes a peak 1104, first second and third valleys 1106, 1108 and 1110, which are below the peak 1104, and fourth and fifth valleys 1112 and 1114 above the peak 1104. The presence of multiple valleys in the range below the 1104 peak could mean that there are foreground regions of differing intensity, such as the preprinted text and handwritten text on a personal check. It could also mean that there are regions that contain darker background, texture, or graphics.

One way to distinguish these two cases is as follows: Find the valley V1 closest to the max peak (in this case valley 1110 nearest peak 1104), but meets the criteria that it is not in the vicinity of the max peak, and it is much lower than the max peak. If a valley is too close to the highest peak or too high, it means that it simply is a variation in the background intensity that results from the lighting or an imperfect imaging device. Find the lowest valley V2 in the range below the max peak (in this case valley 1106). If V1 is the same as V2, use its intensity level as the threshold. If V1 is low enough ($\frac{1}{10}$ of the max peak), then use its intensity as the threshold. If there are no other valleys between V1 and V2, and V1 is closer to V2 than to max peak, choose V1 as threshold, otherwise choose V2. If there are other valleys between V1 and V2, pick the valley between them that is closest to V1, whose level is no higher than $\frac{1}{10}$ of the max peak.

Figure 12:
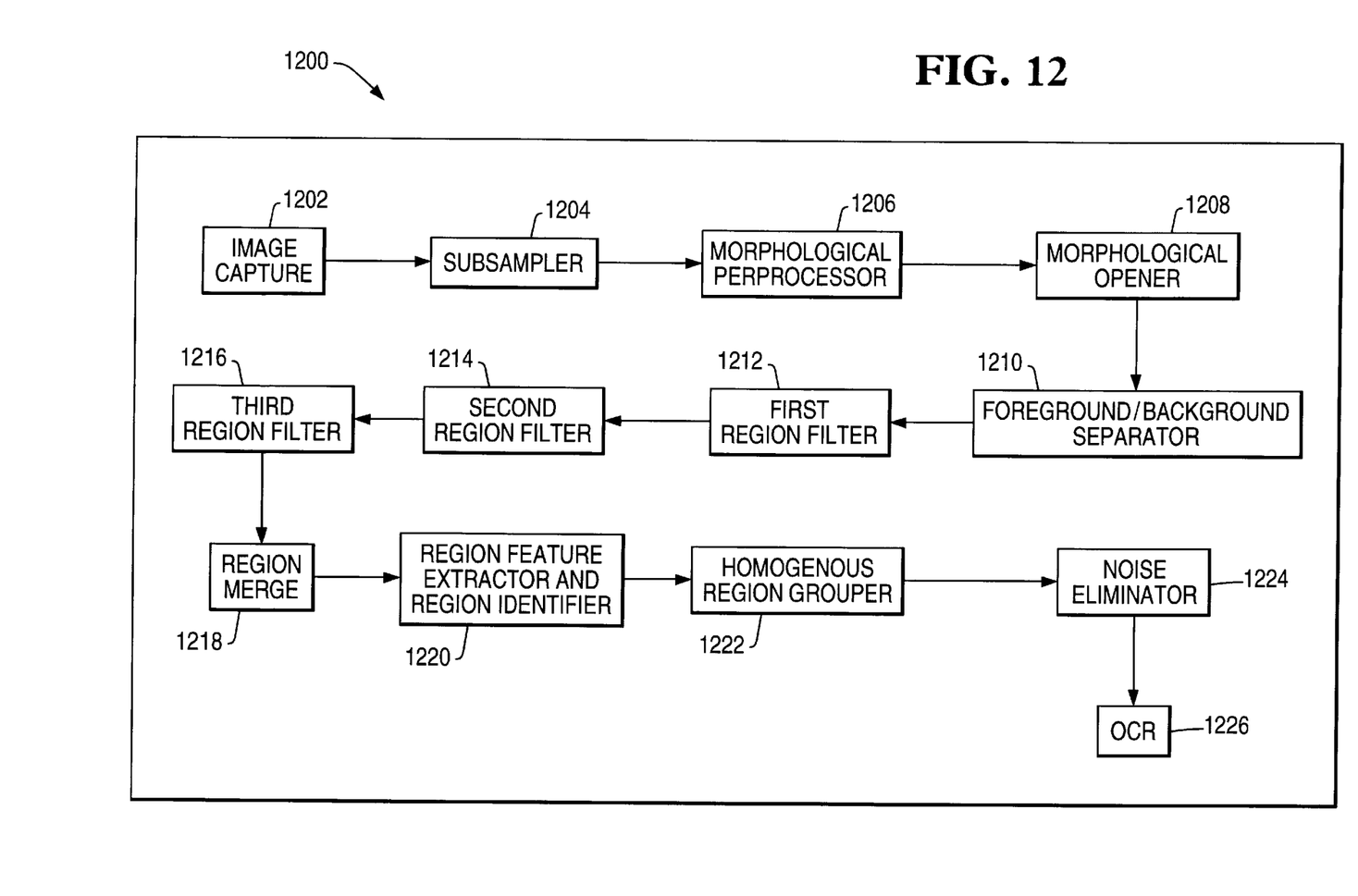
FIG. 12 illustrates a gray-image text identification system according to the present invention.

FIG. 12 illustrates a gray-image text identification system 1200 according to the present invention. The system 1200 includes an image capture element 1202, which captures an image of a document to be processed. The image capture element 1202 may suitably be any of a number of standard image capture devices, such as scanners. The image capture element 1202 passes the captured image to a subsampler 1204, which preferably subjects the captured image to a reduction to produce a subsampled image. The subsampler 1204 passes the subsampled image to a preprocessor 1206 which performs preprocessing on the subsampled image to create a preprocessed image having horizontal and vertical lines removed. The preprocessor 1204 passes the preprocessed image to a morphological opener 1208 which performs a morphological open on the preprocessed image to create an opened image. The morphological opener 1208 passes the opened image to a foreground/background separator 1210, which performs foreground/background separation on the opened image to create a separated image. The foreground/background separator 1210 passes the separated image to first region filter 1212, which performs filtering and passes the image to second region filter 1214, which performs further region filtering and passes the image to third region filter 1216, which performs final region filtering to produce a region-filtered image which is then passed to a region merge element 1218. The region merge element 1218 performs a merge of regions to produce a region-merged image, which is then passed to the region feature extractor 1220. The region feature extractor 1220 performs feature extraction and identification of regions to produce a region-extracted image. The region feature extractor passes the region-extracted image to the region grouping element 1222, which produces a region-grouped image. The region grouping element passes the region-grouped image to a noise eliminator 1224, which performs noise elimination to produce a region-identified image. The region-identified image includes a number of small regions, each identified as a region of machine-printed text, handwritten text, or other data. The noise eliminator 1224 passes the region-identified image to an optical character recognition (OCR) element 1226, which performs OCR on each of the machine-printed text and handwritten text regions. Because the regions are small and their content is identified, the OCR element 1226 is able to perform OCR on each region more efficiently.

While the present invention is disclosed in the context of a presently preferred embodiment, it will be recognized that a wide variety of implementations may be employed by persons of ordinary skill in the art consistent with the above discussion and the claims which follow below.

We claim:

1. A method of text identification to identify text areas on a captured image, comprising the steps of:

performing a morphological open operation on the image;

performing segmentation on the image to separate foreground information from background information to produce a foreground image;

performing region filtering on the foreground image to remove connected regions which are unlikely to be text areas;

performing region feature extraction and region identification on each region to identify machine printed text and hand printed text regions;

performing homogenous region grouping to group neighboring regions of the same type; and performing noise filtering to remove regions too large to be text.

2. The method of claim 1 wherein the step of performing a morphological open operation on the image is preceded by a step of subsampling the image.

3. The method of claim 2 wherein the step of subsampling the image is followed by a step of preprocessing to remove horizontal lines from the image.

4. The method of claim 3 wherein the step of preprocessing also removes vertical lines from the image.

5. The method of claim 4 wherein the step of performing region filtering on the foreground image is followed by a step of performing region merging to reconstruct fragmented text.

6. The method of claim 5 wherein the step of performing noise filtering to remove regions too large to be text is followed by a step of performing optical character recognition on the remaining regions.

7. The method of claim 6 wherein the step of preprocessing includes the substeps of:

comparing each pixel in the image to a predetermined threshold;

for each row of pixels in the image, counting a number of pixels darker than the threshold;

performing statistical analysis on the pixels to identify horizontal and vertical lines; and removing the horizontal and vertical lines.

8. The method of claim 7 wherein the step of statistical analysis includes the substeps of creating a histogram curve based on numbers of pixels of a particular brightness, forming a gradient curve based on the histogram curve to determine a threshold, filtering to fill possible line breaks, and using the threshold to identify dark pixels.

9. The method of claim 8 wherein the morphological operation is applied only horizontally.

10. The method of claim 9 wherein the step of segmentation includes the substeps of:

creating a pixel intensity histogram;

identifying the type of histogram;

analyzing the histogram to determine a threshold; and separating the foreground and background, with pixels with an intensity below the threshold being identified as foreground pixels and pixels with an intensity above the threshold being identified as background pixels.

11. The method of claim 10 wherein the step of identifying the type of histogram includes the substeps of identifying the type of histogram as a unimodal, bimodal, high-valley bimodal, multiple valley, or complex multiple valley histogram.

12. The method of claim 11 wherein the step of analyzing the histogram to determine the threshold further includes the substeps of determining whether the histogram is a unimodal histogram having a single peak and, if the histogram is a unimodal histogram, setting the threshold at one-half the level of the peak.

13. The method of claim 12 wherein the step of analyzing the histogram to determine the threshold further includes the substeps of determining whether the histogram is a bimodal histogram having two peaks with a valley between the two peaks, and, if the histogram is a bimodal histogram, setting the threshold at the level of the valley between the two peaks.

14. The method of claim 13 wherein the step of analyzing the histogram to determine the threshold further includes the substeps of determining whether the histogram is a high-valley bimodal histogram having valleys all of which have higher intensities than a highest peak, and, if the histogram is a high-valley bimodal histogram, setting the threshold at the level of the first valley.

15. The method of claim 14 wherein the step of analyzing the histogram to determine the threshold further includes the substeps of determining whether the histogram is a simple multiple-valley histogram having multiple peaks and valleys, exactly one of the valleys having an intensity above the intensity of the highest peak and, if the histogram is a simple multiple-valley histogram, setting the threshold at the level of the first valley.

16. The method of claim 15 wherein the step of analyzing the histogram to determine the threshold further includes the substeps of determining whether the histogram is a complex multiple-valley histogram having multiple peaks and valleys, one or more of the valleys having an intensity above the intensity of the highest peak and one or more of the valleys having an intensity below the intensity of the highest peak and, if the histogram is a complex multiple-valley histogram, performing the steps of:

finding the valley V1 closest to the highest peak;

finding the lowest valley V2 in the range below the highest peak;

if V1 is the same as V2, using its intensity level as the threshold;

if V1 is low enough (1/10 of the max peak), using its intensity as the threshold;

if there are no other valleys between V1 and V2, and V1 is closer to V2 than to the highest peak, choosing V1 as threshold, otherwise choosing V2; and if other valleys exist between V1 and V2, using as the threshold the valley between them that is closest to V1, whose level is no higher than 1/10 of the highest peak.

17. A gray-image text identification system comprising:

an image capture element for capturing an image;

a subsampler for performing subsampling on the image to reduce the complexity of the image, producing a subsampled image;

a preprocessor for removing horizontal lines from the subsampled image to produce a preprocessed image;

a morphological opener to perform a morphological open operation on the preprocessed image to produce an opened image;

a foreground/background separator for performing foreground/background separation on the opened image to produce a separated image;

a plurality of region filters each of which performs successive region filtering on the separated image to produce a region-filtered image;

a region merge element which performs a merge of regions to produce a region-merged image;

a region feature extractor which performs feature extraction and identification to form a region-extracted image having machine printed text and hand printed text regions identified;

a region grouping element which performs region grouping on the region-extracted image to produce a region-merged image;

a noise eliminator which performs noise elimination on the region-grouped image to produce a region-identified image comprising one or more small identified text regions; and an optical character recognition element which performs optical character recognition on each of the identified text regions.

18. The text identification system of claim 17 wherein the preprocessor is also operative to remove vertical lines from the image.

19. The method of claim 1 wherein the captured image is an image of a financial document.

20. The method of claim 1 wherein the image contains machine printed text and hand printed text regions.

21. The text identification system of claim 18 wherein the image capture element operates on a financial document to capture the image.

22. The text identification system of claim 21 wherein the financial document contains machine printed text and hand printed text and wherein the image contains machine printed text and hand printed text regions.

\* \* \* \* \*

UNITED STATES PATENT AND TRADEMARK OFFICE
CERTIFICATE OF CORRECTION

PATENT NO.        : 6,301,386 B1
APPLICATION NO. : 09/207974
DATED             : October 9, 2001
INVENTOR(S)       : Michael Moed et al.

It is certified that error appears in the above-identified patent and that said Letters Patent is hereby corrected as shown below:

Column 7, Line 33, after "identify" insert --foreground--.

Column 7, Line 38, delete ";" and insert --foreground information being separated from background information based on relative lightness or darkness of pixels representing foreground information and pixels representing background information;--.

Column 9, Line 28, delete ";" and insert --the foreground/background separator being operative to separate foreground elements from background elements based on relative lightness or darkness of pixels comprising foreground and background elements;--.

Column 10, Line 22, after "claim" delete "1" and insert --19--.

Signed and Sealed this

Fourth Day of March, 2008

JON W. DUDAS
*Director of the United States Patent and Trademark Office*